US012801505B2

(12) United States Patent
Ma

(10) Patent No.: US 12,801,505 B2
(45) Date of Patent: Nov. 17, 2026

(54) DETECTION METHOD FOR MEMORY LEAK DETECTION, DETECTION MODULE, AND ELECTRONIC DEVICE

(71) Applicant: VIVO MOBILE COMMUNICATION CO., LTD., Dongguan (CN)

(72) Inventor: Hongwei Ma, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 280 days.

(21) Appl. No.: 18/412,943

(22) Filed: Jan. 15, 2024

(65) Prior Publication Data

US 2024/0152439 A1 May 9, 2024

Related U.S. Application Data

(63) Continuation of application No. PCT/CN2022/106104, filed on Jul. 15, 2022.

(30) Foreign Application Priority Data

Jul. 16, 2021 (CN) ......................... 202110807507.8

(51) Int. Cl.
*G06F 11/30* (2006.01)
*G06F 11/07* (2006.01)

(52) U.S. Cl.
CPC ........ *G06F 11/3037* (2013.01); *G06F 11/079* (2013.01)

(58) Field of Classification Search
None
See application file for complete search history.

(56) References Cited

U.S. PATENT DOCUMENTS 9,104,567 B2 * 8/2015 Moser ................. G06F 11/0751
2005/0235127 A1 10/2005 Muthiah et al.
(Continued)

FOREIGN PATENT DOCUMENTS

CA 2426619 A 10/2004
CN 101145128 A 3/2008
(Continued)

OTHER PUBLICATIONS

BLeak: Automatically Debugging Memory Leaks in Web Applications (Year: 2018).*
(Continued)

*Primary Examiner* — Khoa D Doan
*Assistant Examiner* — Marwan Ayash
(74) *Attorney, Agent, or Firm* — The Webb Law Firm

(57) ABSTRACT

A detection method includes sending a first command to a first electronic device; receiving a first target value sent by the first electronic device, where the first target value includes a quantity of allocated memory blocks in the first electronic device in a case that the first electronic device performs a first operation; sending a second command to the first electronic device in a case that the first electronic device performs a second operation; receiving a second target value sent by the first electronic device, where the second target value includes a quantity of allocated memory blocks in the first electronic device in the case that the first electronic device performs the second operation; and determining, in a case that the second target value is greater than the first target value, that there is a memory leak in the first electronic device.

14 Claims, 4 Drawing Sheets

(56) References Cited

U.S. PATENT DOCUMENTS

| | | | | |
|---|---|---|---|---|
| 2011/0145536 | A1* | 6/2011 | Zachmann | G06F 11/0751 711/170 |
| 2012/0216076 | A1 | 8/2012 | Macik et al. | |
| 2015/0234700 | A1* | 8/2015 | Qin | G06F 9/50 714/38.11 |
| 2017/0168886 | A1* | 6/2017 | Li | G06F 11/079 |
| 2020/0042371 | A1 | 2/2020 | Park et al. | |
| 2021/0334192 | A1* | 10/2021 | Zeng | G06F 9/5016 |

FOREIGN PATENT DOCUMENTS

| | | | |
|---|---|---|---|
| CN | 101587455 | A | 11/2009 |
| CN | 102375776 | A | 3/2012 |
| CN | 106407031 | A | 2/2017 |
| CN | 107783908 | A | 3/2018 |
| CN | 111352829 | A | 6/2020 |
| CN | 111639018 | A | 9/2020 |
| CN | 112241366 | A | 1/2021 |
| CN | 113687942 | A | 11/2021 |
| WO | 2012127482 | A1 | 9/2012 |

OTHER PUBLICATIONS

Shi, Jian et al., "Buffer Management Technologies for High-Layer Protocol", Computer Technology and Development, Nov. 2009, vol. 19, No. 11, Abstract.

* cited by examiner

DETECTION METHOD FOR MEMORY LEAK DETECTION, DETECTION MODULE, AND ELECTRONIC DEVICE

CROSS-REFERENCE TO RELATED APPLICATIONS

This application is a Bypass Continuation Application of International Patent Application No. PCT/CN2022/106104, filed Jul. 15, 2022, and claims priority to Chinese Patent Application No. 202110807507.8, filed Jul. 16, 2021, the disclosures of which are hereby incorporated by reference in their entireties.

BACKGROUND OF THE INVENTION

Field of the Invention

This application pertains to the field of communication technologies, and particularly relates to a detection method and apparatus, and an electronic device.

Description of Related Art

With the promotion and popularization of smart terminal products, wearable devices (for example, smart watches) gradually become essential for people's work and life, especially smart watches with long battery endurance. Currently, a scheme of a micro control unit (MCU, also referred to as a single-chip microcomputer) and a real time operating system (RTOS) is generally used in a system of a smart watch with long battery endurance. However, because the MCU has limited resources, and a memory of the smart watch with long battery endurance has limited size, in a software development process, if a memory leak occurs, a large amount of system memory is occupied after memory leaks are accumulated for a plurality of times, and consequently, the system cannot run normally.

SUMMARY OF THE INVENTION

According to a first aspect, an embodiment of this application provides a detection method. The detection method is applied to a detection module and includes: sending a first command to a first electronic device, where the first command is used to request a first memory parameter of the first electronic device; receiving a first target value sent by the first electronic device, where the first target value includes a quantity of allocated memory blocks in the first electronic device in a case that the first electronic device performs a first operation; sending a second command to the first electronic device in a case that the first electronic device performs a second operation, where the second command is used to request a second memory parameter of the first electronic device; receiving a second target value sent by the first electronic device, where the second target value includes a quantity of allocated memory blocks in the first electronic device in the case that the first electronic device performs the second operation; and determining, in a case that the second target value is greater than the first target value, that there is a memory leak in the first electronic device.

According to a second aspect, an embodiment of this specification provides a detection method. The method is applied to a first electronic device and includes: receiving a first command sent by a detection module, where the first command is used to request a first memory parameter of the first electronic device; sending a first target value to the detection module, where the first target value includes a quantity of allocated memory blocks in the first electronic device in a case that the first electronic device performs a first operation; in a case that the first electronic device performs a second operation, receiving a second command sent by the detection module, where the second command is used to request a second memory parameter of the first electronic device; and sending a second target value to the detection module, where the second target value includes a quantity of allocated memory blocks in the first electronic device in the case that the first electronic device performs the second operation, where in a case that the second target value is greater than the first target value, there is a memory leak in the first electronic device.

According to a third aspect, an embodiment of this application provides a detection apparatus. The detection apparatus includes a sending module, a receiving module, and a determining module, where the sending module is configured to send a first command to a first electronic device, where the first command is used to request a first memory parameter of the first electronic device; the receiving module is configured to receive a first target value sent by the first electronic device, where the first target value includes a quantity of allocated memory blocks in the first electronic device in a case that the first electronic device performs a first operation; the sending module is further configured to send a second command to the first electronic device in a case that the first electronic device performs a second operation, where the second command is used to request a second memory parameter of the first electronic device; the receiving module is further configured to receive a second target value sent by the first electronic device, where the second target value includes a quantity of allocated memory blocks in the first electronic device in the case that the first electronic device performs the second operation; and the determining module is configured to determine, in a case that the second target value is greater than the first target value, that there is a memory leak in the first electronic device.

According to a fourth aspect, an embodiment of this application provides a detection apparatus. The detection apparatus includes a receiving module and a sending module, where the receiving module is configured to receive a first command sent by a detection module, where the first command is used to request a first memory parameter of the first electronic device; the sending module is configured to send a first target value to the detection module, where the first target value includes a quantity of allocated memory blocks in the first electronic device in a case that the first electronic device performs a first operation; the receiving module is further configured to: in a case that the first electronic device performs a second operation, receiving a second command sent by the detection module, where the second command is used to request a second memory parameter of the first electronic device; and the sending module is further configured to send a second target value to the detection module, where the second target value includes a quantity of allocated memory blocks in the first electronic device in the case that the first electronic device performs the second operation, where in a case that the second target value is greater than the first target value, there is a memory leak in the first electronic device.

According to a fifth aspect, an embodiment of this application provides a detection module. The detection module includes a processor, a memory, and a program or an instruction stored in the memory and executable on the processor, and when the program or the instruction is executed by the processor, the steps of the method according to the first aspect are implemented.

According to a sixth aspect, an embodiment of this application provides an electronic device. The electronic device includes a processor, a memory, and a program or an instruction stored in the memory and executable on the processor, and when the program or the instruction is executed by the processor, the steps of the method according to the second aspect are implemented.

According to a seventh aspect, an embodiment of this application provides a non-transitory readable storage medium. The non-transitory readable storage medium stores a program or an instruction, and when the program or the instruction is executed by a processor, the steps of the method according to the first aspect or the steps of the method according to the second aspect are implemented.

According to an eighth aspect, an embodiment of this application provides a chip. The chip includes a processor and a communication interface, the communication interface is coupled to the processor, and the processor is configured to run a program or an instruction to implement the method according to the first aspect or the method according to the second aspect.

DESCRIPTION OF THE INVENTION

Figure 1:
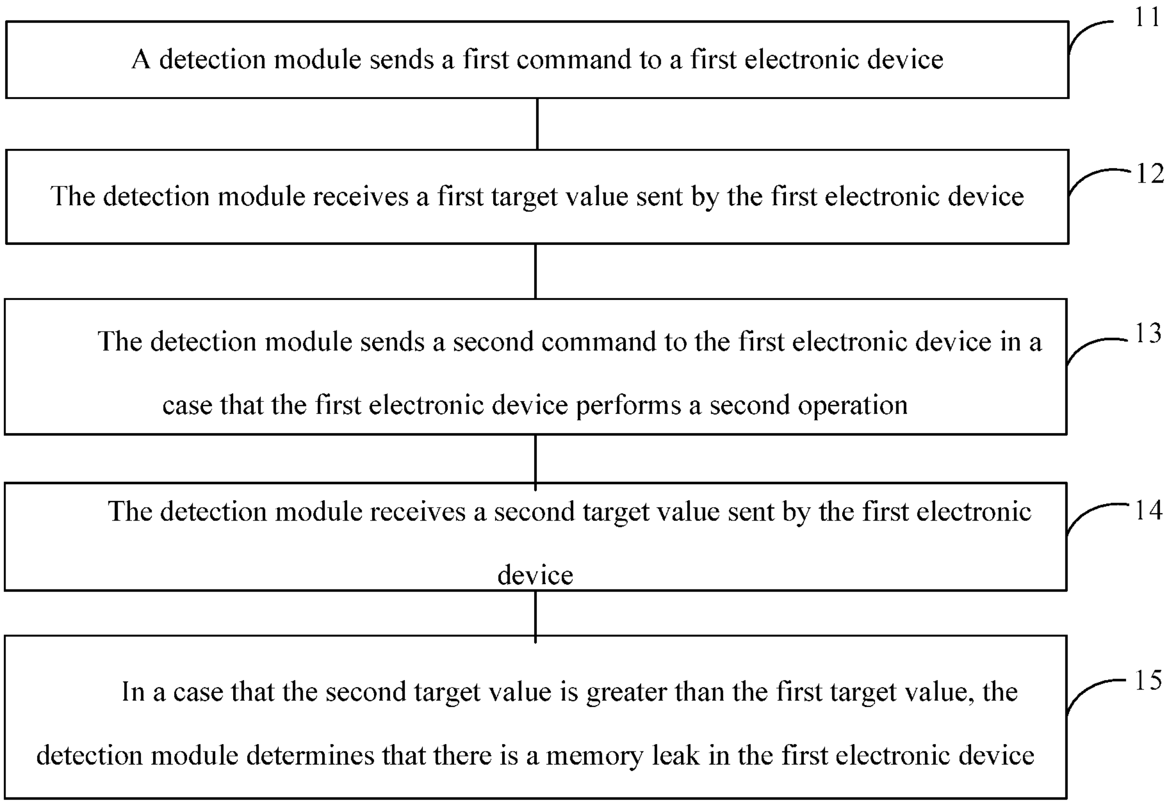
FIG. 1 is a first schematic diagram of a detection method according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first", "second", and the like are intended to distinguish between similar objects but do not describe a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

With reference to the accompanying drawings, a detection method and apparatus, and an electronic device provided in the embodiments of this application are described in detail by using embodiments and application scenes thereof.

The embodiments of this application may be applied to a scene in which a user detects a leak in a memory block in an electronic device.

With the promotion and popularization of smart terminal products, wearable devices (for example, smart watches) gradually become essential for people's work and life, especially smart watches with long battery endurance. Currently, an MCU+RTOS scheme is generally used in a system of a smart watch with long battery endurance. However, due to limitations of system characteristics and platforms, the RTOS has a high development and debugging difficulty, and requires higher requirements for software developers. Moreover, the MCU has limited resources, with extremely limited size for a read-only memory (ROM) and a random access memory (RAM). In software development, a memory leak is a common bug. Generally, the MCU has limited computational power, with a maximum frequency of less than 200 MHz. When the system runs, a service applies for a memory block when using the memory, and releases the memory block after being used. If the memory block is not released after being used, a memory leak is caused. If a memory leak occurs, the system will not be affected at first. However, the memory block cannot be released due to a plurality of times of memory leaks, and a large amount of system memory is occupied, and consequently, the system cannot run normally.

In order to detect and locate a memory leak quickly and accurately, in the conventional technology, code troubleshooting needs to be performed, or a developer designs a set of memory leak automatic detection algorithms. However, in the code troubleshooting method in the conventional technology, the developer generally needs to be familiar with code logic, determine a possible location of a memory leak, and then perform a code modification test to detect and locate the memory leak. In this way, a test period is relatively long, and development efficiency of the developer is greatly reduced. If the developer designs a set of memory leak automatic detection algorithms, not only the algorithms are complex, but also a large amount of data generated during running needs to be stored, and the location of the memory leak may not be accurately identified. As a result, operations of the developer are cumbersome and time-consuming, and efficiency of detecting a memory leak by an electronic device is low.

In addition, with the current MCU configuration, the normal system running and services are saturated. Without external means, the memory leak cannot be detected automatically on the MCU through the running algorithm. On the Linux platform, there is a tool for automatically detecting the memory leak. The developer places the code in the tool to run. After the running of the code ends, the tool may directly display a detection result to the developer. However, in the RTOS system, due to different implementation mechanisms of the system, once the code on in the RTOS starts running, it will never exit. Therefore, this detection manner cannot be used in the RTOS system.

To resolve the foregoing problem, in the embodiments of this application, a smart watch system and a personal computer (PC) system may perform signaling interaction in a process in which a developer performs repeated operations (for example, page switching) on the smart watch system, to detect whether a memory block of the smart watch system leaks.

It should be noted that the performing repeated operations on the smart watch system may be: performing repeated switching operations on a page in the smart watch system; or performing repeated operations of inputting and deleting a character in the smart watch system; or performing repeated sending operations on data/signaling by using the smart watch system, or the like. Certainly, the repeated operations performed by the smart watch system may further include other repeated operations, which are not enumerated herein in the embodiments of this application. Schemes in which repeated operations are performed in the smart watch system to obtain information about a memory block, so as to determine whether there is a memory leak fall within the protection scope of the embodiments of this application. In the embodiments of this application, only a scene of page switching (that is, page switching operations are performed on a page in the smart watch system) is used as an example to describe the detection method provided in the embodiments of this application. In actual implementation, another scene (or another repeated operation process) may be used as an example to describe the detection method. This is not limited in the embodiments of this application.

In the embodiments of this application, the smart watch system displays one page (for example, a page 1). A user (for example, a developer) may perform an input in the PC system, to trigger the PC system to send a command (for example, a command 1) to the smart watch system, so as to request information about a currently allocated memory block in the smart watch system from the smart watch system, so that the smart watch system may send one piece of information (for example, information 1) to the PC system according to the command 1, where the information 1 includes at least a first target value (that is, a quantity of allocated memory blocks in the smart watch system when a first page is displayed) corresponding to the first page. Then, the user may continue to perform an input in the smart watch system, so that the smart watch system switches the page 1 to another page (for example, a page 2), and then switches to the page 1, that is, completes a page switching process. In this case, the user may perform an input in the PC system, to trigger the PC system to send a command (for example, a command 2) to the smart watch system, so as to request information about a currently allocated memory block in the smart watch system from the smart watch system, so that the smart watch system may send one piece of information (for example, information 2) to the PC system according to the command 2, where the information 2 includes at least one second target value (that is, a quantity of allocated memory blocks in the smart watch system when the first page is displayed after page switching) corresponding to the first page after page switching. The user may repeatedly perform page switching operations between the page 1 and the page 2, so that the smart watch system completes N page switching processes, so as to obtain N pieces of information 2 (each piece of information 2 corresponds to one page switching process). In this way, the PC system or the developer may determine, according to the information 1 and N pieces of information 2, whether there is a memory leak in the smart watch system.

According to the foregoing scheme of this application, in a page switching scene, the smart watch system and the PC system perform signaling interaction, to send information (for example, a quantity) of currently allocated memory blocks in the smart watch system to the PC system during each time of page display, so that it can be determined, based on the information about the allocated memory blocks, whether there is a memory leak in the smart watch system, and it is not necessary for the developer to specifically design a set of memory leak automatic detection algorithms to detect a memory leak. In this way, operations and time consumption of the developer are reduced, and efficiency of detecting whether there is a memory leak is improved.

An embodiment of this application provides a detection method. FIG. 1 is a flowchart of a detection method according to an embodiment of this application. As shown in FIG. 1, the detection method provided in this embodiment of this application may include the following step 11 to step 15.

Step 11: A detection module sends a first command to a first electronic device.

In this embodiment of this application, the first command is used to request a first memory parameter of the first electronic device.

It should be noted that the detection module may be a module in the first electronic device, or may be a second electronic device, or may be a module in the second electronic device.

Optionally, in this embodiment of this application, the first electronic device may be a smart wearable device (for example, a smart watch, or smart glasses, a smart headset, or a smart dress) that runs an RTOS system. This may be determined according to an actual use requirement, and is not limited in this embodiment of this application.

Optionally, in this embodiment of this application, the second electronic device may be a personal computer (PC) system or a mobile phone application system. This may be determined according to an actual use requirement, and is not limited in this embodiment of this application.

Step 12: The detection module receives a first target value sent by the first electronic device.

In this embodiment of this application, the first target value includes a quantity of allocated memory blocks in the first electronic device in a case that the first electronic device performs a first operation.

Step 13: The detection module sends a second command to the first electronic device in a case that the first electronic device performs a second operation.

In this embodiment of this application, the second command is used to request a second memory parameter of the first electronic device.

Step 14: The detection module receives the second target value sent by the first electronic device.

In this embodiment of this application, the second target value includes a quantity of allocated memory blocks in the first electronic device in the case that the first electronic device performs the second operation.

Step 15: The detection module determines, in a case that the second target value is greater than the first target value, that there is a memory leak in the first electronic device.

Figure 2:
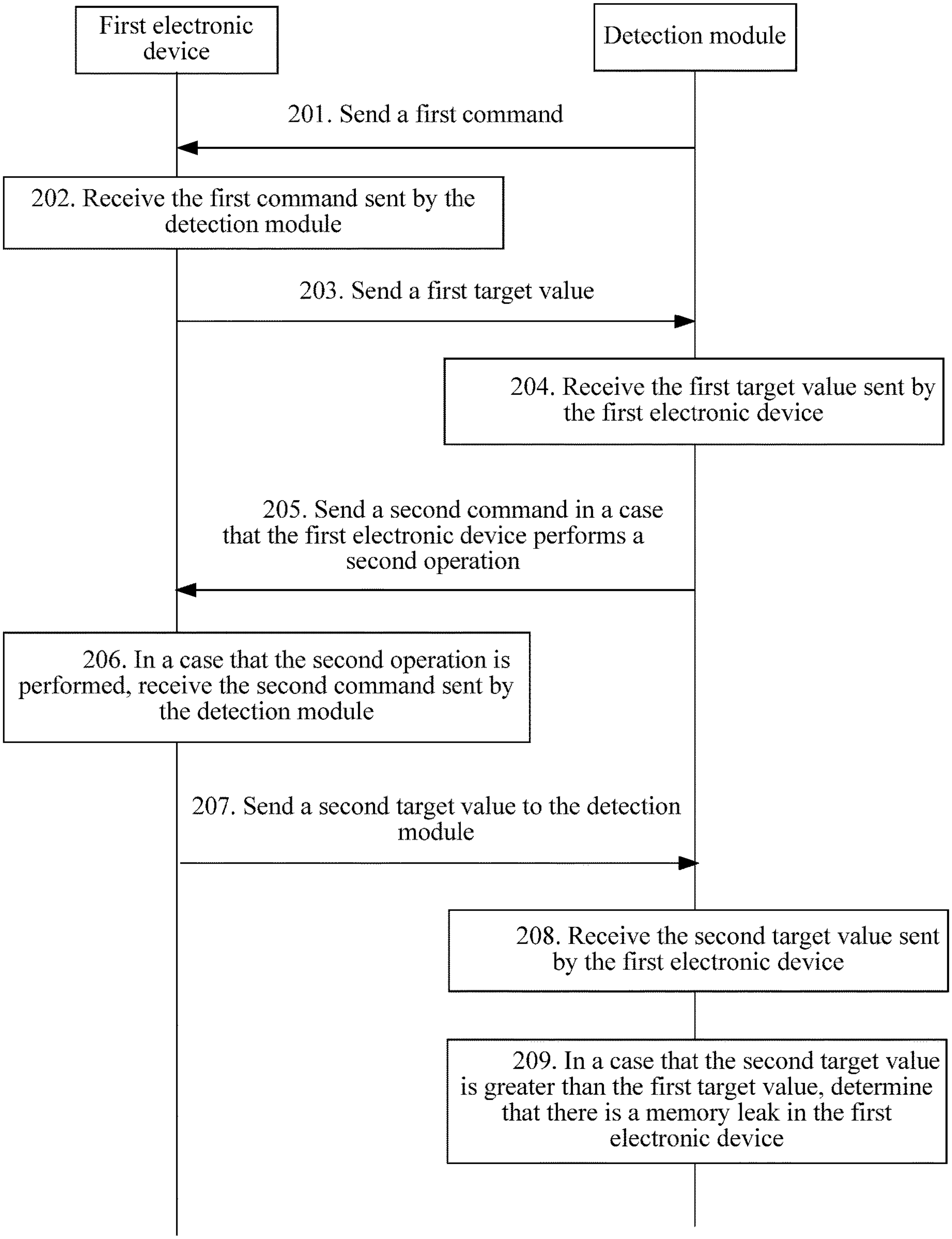
FIG. 2 is a second schematic diagram of a detection method according to an embodiment of this application.

The following describes the detection method provided in this embodiment of this application by using an interaction embodiment. As shown in FIG. 2, the detection method provided in this embodiment of this application may include the following steps 201 to 209.

Step 201: A detection module sends a first command to a first electronic device.

Step 202: The first electronic device receives the first command sent by the detection module.

Step 203: The first electronic device sends a first target value to the detection module.

In this embodiment of this application, the first target value includes a quantity of allocated memory blocks in the first electronic device in a case that the first electronic device performs a first operation.

Optionally, in this embodiment of this application, in a case that a first page is displayed, the first electronic device sends a first target value to a second electronic device according to a first command sent by the second electronic device (an example in which the detection module is the second electronic device is used for description), where the first target value is a quantity of allocated memory blocks in the first electronic device when the first page is displayed.

In this embodiment of this application, the first command is used to request a quantity of currently allocated memory blocks in the first electronic device from the first electronic device.

Optionally, in this embodiment of this application, the first page is any page of an application in the first electronic device; or the first page is a page in a desktop of the first electronic device.

It should be noted that the first page is a page before page switching, and may be referred to as a page in an ORIGIN state.

In this embodiment of this application, the first command is used to request information about an allocated memory block in the first electronic device from the first electronic device, that is, the first command is a command for obtaining monitoring data in the first electronic device (that is, related data of detecting/monitoring a memory block by the first electronic device, for example, monitoring data at a level of instrumentation code currently running in the first electronic device), and may be recorded as CMD_GET_DATA.

Optionally, in this embodiment of this application, the first electronic device may provide a plurality of types of memory application functions (which may also be referred to as dynamic memory allocation function (MALLOC)) and memory release functions, to manage different types of memories. When the first page is displayed, the first electronic device may request to allocate a corresponding memory block to the first page from a system memory of the first electronic device by calling a memory application function.

It should be noted that, after the first electronic device allocates the corresponding memory block to the first page, when the first page changes (for example, page switching), before the first electronic device allocates a memory block to the changed first page, the first electronic device may first release, by invoking a memory release function (free), the memory block allocated to the first page in the ORIGIN state (that is, before switching).

Optionally, in this embodiment of this application, when sending the first target value to the detection module, the first electronic device may further send at least one of the following: a quantity of allocated memory blocks, a size of an allocated memory block, or a call stack (the call stack is used to record code used when the allocated memory block is called).

Step 204: The detection module receives the first target value sent by the first electronic device.

Step 205: The detection module sends a second command to the first electronic device in a case that the first electronic device performs a second operation.

In this embodiment of this application, the second command is used to request a second memory parameter of the first electronic device.

Optionally, in this embodiment of this application, in a process of performing N times of page switching, for each time of page switching, the first electronic device sends one second target value to the second electronic device according to one second command sent by the second electronic device, to send N second target values, where the one second target value is a quantity of allocated memory blocks in the first electronic device when the switched first page is displayed. Each time of page switching in the foregoing N times of page switching is switching from the first page to a second page and switching from the second page to the first page, where N is a positive integer.

In this embodiment of this application, the first target value and the N second target values are used to determine whether there is a memory leak in the first electronic device.

It should be noted that a developer or the second electronic device may determine, according to the first target value and the N second target values, whether there is a memory leak in the first electronic device.

In this embodiment of this application, for each second command in N second commands, one second command is used to request a quantity of currently allocated memory blocks in the first electronic device from the first electronic device.

In this embodiment of this application, in a case that the first electronic device displays the first page, the developer may perform an input on the second electronic device, so that the second electronic device sends the first command to the first electronic device, and then the first electronic device may send the first target value to the second electronic device according to the received first command. Then, the developer may perform a first page switching input on the first electronic device, so that the first electronic device switches the currently displayed first page to the second page, and switches from the second page to the first page for display (that is, completes a first page switching process). In this case, the developer may perform an input on the second electronic device, so that the second electronic device sends one second command to the first electronic device, and then the first electronic device may send one second target value to the second electronic device according to the received second command. Then, the developer may perform a second page switching input on the first electronic device, so that the first electronic device switches the currently displayed first page to the second page, and switches from the second page to the first page for display (that is, completes a second page switching process). In this case, the developer may perform an input on the second electronic device, so that the second electronic device sends one second command to the first electronic device, and then the first electronic device may send one second target value to the second electronic device according to the received second command. By analogy, an N-th page switching process is completed, that is, N second target values are sent.

It should be noted that the page switching process (which may also be referred to as a page switching scene) described in this embodiment of this application may be denoted as a scene. A scene is a set of operation sequences, and some scenes are very simple, such as interface sliding; and some scenes may be very complex, such as data communication between a plurality of chips and a remote network. Memory leak detection is strongly correlated with a scene, and a memory leak in a specified scene is detected.

Optionally, in this embodiment of this application, a scene may be entering from an interface A to an interface B; or entering from an interface C to an interface B; or performing sliding upwards, downwards, leftwards, or rightwards on an interface D; or connecting the first electronic device to another electronic device and synchronizing data. This embodiment of this application is implemented by entering from the first page to the second page and then returning to the first page. The foregoing N page switching processes are repeated operations of a specified scene.

It should be noted that, the quantity of allocated memory blocks in the first electronic device when the switched first page is displayed may be understood as follows: When the system runs, page switching needs to invoke a memory application function to obtain a quantity of memory blocks corresponding to application to a system memory by the switched first page.

Step 206: In a case that the first electronic device performs the second operation, the first electronic device receives the second command sent by the detection module.

Step 207: The first electronic device sends a second target value to the detection module.

In this embodiment, the second target value includes a quantity of allocated memory blocks in the first electronic device in the case that the first electronic device performs the second operation. In a case that the second target value is greater than the first target value, there is a memory leak in the first electronic device.

Step 208: The detection module receives the second target value sent by the first electronic device.

Step 209: In a case that the second target value is greater than the first target value, the detection module determines that there is a memory leak in the first electronic device.

Optionally, in this embodiment of this application, the second operation includes a plurality of second sub-operations, and the second target value includes a plurality of sub-target values corresponding to the plurality of second sub-operations. In a case that each two adjacent sub-target values in the plurality of sub-target values correspond to a same variation, there is a memory leak in the first electronic device.

Optionally, in this embodiment of this application, in a case that a first quantity is greater than or equal to a first preset threshold, there is a memory leak in the first electronic device.

Optionally, in this embodiment of this application, in a case that a first quantity is less than a first preset threshold, there is no memory leak in the first electronic device.

In this embodiment of this application, the first quantity is a quantity of same variations in at least one variation, each variation is a variation of each two adjacent target values in all target values, and all the target values include the first target value and the N second target values.

It can be understood that, in one manner, in a case that each two adjacent target values in all the target values are in equivalent increments, it is determined that there is a memory leak in the first electronic device. For example, if the first target value is 3000 and the N second target values are 3003, 3006, 3009, and the like, it is determined that the target values are in equivalent increments, and therefore it is determined that there is a memory leak in the first electronic device.

In another manner, a variation of each two adjacent target values in all target values may be calculated, and in a case that a few variations (for example, a quantity of variations is less than the first preset threshold) is different from another variation, or all variations are the same, it is determined that there is a memory leak in the first electronic device. Otherwise, it is determined that there is no memory leak in the first electronic device. For example, if the first target value is 3000, and the N second target values are 3003, 3006, 3010, 3013, 3016, and 3019 successively, variations of each two adjacent target values is 3, 3, 4, 3, 3, and 3 respectively. Only one variation (that is, the variation 4) in these variations is different from another variation (the variation 3), and therefore it may be determined that there is a memory leak in the first electronic device.

It should be noted that, in actual implementation, because a value (which may be denoted as global_block_count) of a total quantity of requested blocks in the system may change dynamically when the system runs dynamically, hopping may occur in global_block_count. To more accurately determine/judge whether the first quantity is greater than or equal to the preset threshold, a same operation may be repeatedly performed for several times, to determine that there is a memory leak when it is determined for a plurality of times that the first quantity is greater than or equal to the preset threshold.

Optionally, in this embodiment of this application, the foregoing step 209 may be implemented by performing the following step 209*a*.

Step 209*a*: In a case that each two adjacent sub-target values in the plurality of sub-target values correspond to a same variation, the detection module determines that there is a memory leak in the first electronic device.

In this embodiment of this application, a sequence of the plurality of sub-target values is determined according to an execution sequence of the plurality of second sub-operations.

The following describes the detection method provided in this embodiment of this application by using an implementation process. A process of detecting whether there is a memory leak is as follows:

21. In an ORIGIN state, send a CMD_GET_DATA command to a smart watch system through a PC console, and check a returned global_block_count value.

22. Execute a scene, then send a CMD_GET_DATA command to the smart watch system, and check a returned global_block_count value.

23. Repeatedly perform the operation in step 22 for a plurality of times, and check a global_block_count value returned each time.

24. If the global_block_count value returned each time does not change or has a change but does not increase, it may be determined that there is no memory leak in this scene. If the global_block_count obtained each time increases regularly, for example, the original global_block_count is 3000, and values obtained each time later are 3003, 3006, 3009, and 3012, it may be determined that there is a memory leak in this scene, and three blocks are leaked each time.

25. A developer fixes a memory leak in this scene.

26. Perform the same test in this scene again after the repair. If global_block_count no longer increases regularly in each operation, it is determined that the memory leak is successfully fixed.

Optionally, in this embodiment of this application, before step 201, the detection method provided in this embodiment of this application further includes the following step 301 to step 303. After the foregoing step 209, the detection method provided in this embodiment of this application further includes the following step 401.

Step 301: The detection module sends a third command to the first electronic device.

In this embodiment of this application, the third command is used to request the first electronic device to run a target program in a first manner. The first target value further includes a size of an allocated memory block in the first electronic device and code used when the allocated memory block is called in the case that the first electronic device performs the first operation. The second target value further includes a size of an allocated memory block in the first electronic device and code used when the allocated memory block is called in the case that the first electronic device performs the second operation.

In this embodiment of this application, the third command is used to instruct the first electronic device to run second-level instrumentation code. The third command may be an enable command (which may be denoted as CMD_CTRL_L2) of the second-level instrumentation code, or the third command may be a switch command from first-level instrumentation code to the second-level instrumentation code.

Step 302: The first electronic device receives the third command sent by the detection module.

Step 303: The first electronic device runs the target program in the first manner according to the third command.

In this embodiment of this application, the first target value and the second target value are used by the detection module to determine a location of the memory leak in the first electronic device.

Step 401: The detection module determines a location of the memory leak in the first electronic device according to the first target value and the second target value.

In this embodiment of this application, in a case that the first page is displayed, the first electronic device receives the third command sent by the second electronic device. The first electronic device runs the second-level instrumentation code according to the third command.

Optionally, in this embodiment of this application, the first electronic device may store instrumentation code in a first preset storage area of the first electronic device according to a first input performed by the user.

In this embodiment of this application, the instrumentation code is used to send information about an allocated memory block in the first electronic device to the second electronic device.

Optionally, in this embodiment of this application, the first preset area is an area for storing code in an MCU.

It should be noted that, in this embodiment, the instrumentation code is inserting a segment of detection code into all types of malloc and free. After malloc succeeds, the instrumentation code runs, and information about this malloc is stored. After free succeeds, the instrumentation code runs, and the previously stored information is deleted.

It can be understood that in this embodiment of this application, if a memory block is successfully released, it is determined that the memory block is not leaked, and the first electronic device no longer monitors the memory block. If a memory block is not released, data stored during use of malloc is used to detect a memory leak.

Optionally, in this embodiment of this application, the foregoing step 401 may be implemented by using the following step 401*a* or step 401*b*.

Step 401*a*: In a case that a target difference is greater than or equal to a preset threshold, the detection module determines a first location as the location of the memory leak in the first electronic device.

In this embodiment of this application, the first location is a memory location of the code used when the allocated memory block is called in the case that the first electronic device performs the second operation. The target difference is a difference between the size of the allocated memory block in the first electronic device in the case that the first electronic device performs the second operation and the size of the allocated memory block in the first electronic device in the case that the first electronic device performs the first operation.

Step 401*b*: In a case that a target difference is less than a preset threshold, the detection module determines a second location as the location of the memory leak in the first electronic device.

In this embodiment of this application, the second location is a memory location of the code used when the allocated memory block is called in the case that the first electronic device performs the first operation.

In this embodiment of this application, when sending the first target value to the detection module, the first electronic device may further send a first size and a first call stack. The first size is a size of an allocated memory block in the first electronic device when the first page is displayed, and the first call stack is a code used when the allocated memory block is called when the first page is displayed.

In this embodiment of this application, when sending one second target value to the detection module, the first electronic device may further send one second size and one second call stack. One second size is a size of an allocated memory block in the first electronic device when the switched first page is displayed, and one second call stack is code used when the allocated memory block is called when the switched first page is displayed.

It can be understood that, in a case of running the second-level instrumentation code, information sent by the first electronic device to the second electronic device includes the first target value, the first size, and the first call stack. In addition, one piece of information sent by the first electronic device to the second electronic device includes one second target value, one second size, and one second call stack.

It should be noted that after the second-level instrumentation code is disabled (that is, running of the second-level instrumentation code ends), all data at the second level may be cleared, to reduce occupation of system resources. The developer may clear the previous data by disabling the second level, without using a dedicated data clearing command. Certainly, data global_block_count at the first level is not cleared. When switching to the second level, the instrumentation code switches to a mode in which the second-level data is stored, and automatically stores data of the second level in a subsequent running process.

Optionally, in this embodiment of this application, in a case that a difference between an (i+1)-th size and an i-th size is greater than or equal to a second preset threshold, code corresponding to an (i+1)-th call stack is code corresponding to a memory leak location, where i is a positive integer.

In this embodiment of this application, the (i+1)-th size and the i-th size are any two adjacent sizes in all sizes, and the all sizes include the first size and N second sizes. The (i+1)-th call stack is a call stack corresponding to the (i+1)-th size in all call stacks, and all the call stacks include the first call stack and N second call stacks.

In this embodiment of this application, when the instrumentation code runs at the second level, because the code running at the second level stores a complete call_stack corresponding to a memory block, in a case that the difference between the (i+1)-th size and the i-th size is greater than or equal to the second preset threshold, the first electronic device may quickly detect and accurately locate a location of a memory leak in this scene. For a simple scene, it usually takes dozens of seconds to determine whether there is a leak in the system memory. For a complex scene, it takes relatively little time to detect a memory leak.

Optionally, in this embodiment of this application, after the foregoing step 401, the detection method provided in this embodiment of this application further includes the following step 501 to step 503.

Step 501: The detection module sends a fourth command to the first electronic device.

In this embodiment of this application, the fourth command is used to request the first electronic device to run the target program in a second manner.

Step 502: The first electronic device receives the fourth command sent by the detection module.

In this embodiment of this application, the fourth command is used to request the first electronic device to run the target program in the second manner.

Optionally, in this embodiment of this application, the instrumentation code includes first-level instrumentation code and second-level instrumentation code.

Optionally, in this embodiment, the first-level instrumentation code is used by the first electronic device to send the first target value and the N second target values to the second electronic device, and delete the first target value and the N second target values.

Optionally, in this embodiment of this specification, the second-level instrumentation code is used by the first electronic device to send the first target value, the N second target values, and the size and the call stack of the allocated memory block to the second electronic device, and store the first target value and the N second target values in a second preset storage area of the first electronic device, and the call stack is used to record code used when the allocated memory block is called.

It should be noted that, in this embodiment of this application, the instrumentation code has two running levels, which are respectively denoted as a first level (L1) and a second level (L2) in ascending order. The first electronic device may switch the two running levels according to a received command.

Optionally, in this embodiment of this application, after the system of the first electronic device is started, the instrumentation code may be run at the first level (that is, L1) by default, and a record of corresponding data (for example, a quantity of memory blocks) is maintained at the first level.

It should be noted that, in this embodiment of this application, data output by the instrumentation code at different levels is different. For example, at the first level, a quantity of allocated memory blocks is output; and at the second level, a quantity of allocated memory blocks, a size of an allocated memory block, and the like are output.

In one case, at the first level, the first electronic device outputs only global_block_count, where global_block_count represents one number, and +1 each time when malloc succeeds and −1 when free succeeds.

In another case, at the second level, a quantity of memory blocks requested by each thread, a size of each memory block, and a function call relationship when each memory block is requested are stored. A size of each memory block may be denoted as block_size, and a function call relationship may be denoted as call_stack. In addition, when the data/information is output, the data may be integrated. During the integration, block_size may be placed at the front, and some additional information is added to facilitate processing by a receiving device. Output information of each block_size+call_stack may be marked as one item. It should be noted that block_size herein may be used by an ITEM to subsequently perform data comparison, that is, by using block_size, the ITEM can more clearly and accurately perform data comparison. Therefore, block_size is carried in the ITEM herein and placed at the front of the ITEM.

It should be noted that the second preset storage area may be understood as an independent storage space dedicated by the first electronic device at a tail of an RAM, to specifically store data during running of system space. The second preset storage area is independent of the system space.

In this embodiment of this application, the first electronic device sends different data to the second electronic device according to a level of the instrumentation code running in the system. When the first electronic device runs the instrumentation code at the first level, because code and stored data that run at this level are few, less system memory is occupied, and therefore the system memory is not affected. When the instrumentation code runs at the second level, the first electronic device may store a complete ITEM corresponding to a memory block and send the complete ITEM to the second electronic device. In this way, called code corresponding to an allocated memory block may be quickly found. Therefore, code corresponding to a memory block of a memory leak may be quickly located, and repair may be quickly performed.

Step 503: The first electronic device runs the target program in the second manner according to the fourth command.

The following describes the memory leak location positioning method provided in this embodiment of this application by using an implementation process. A process of locating a location of a memory leak is as follows:

31. When an ORIGIN state is restored, a PC system sends a CMD_CTRL_L2 (second-level instrumentation program switch) command to a smart watch system, where the instrumentation program is switched to run at the L2 level. In this case, the smart watch system automatically stored data that needs to be stored in at the L2 level.

32. Send a CMD_GET_DATA command to the smart watch system by using a console of the PC system, and store returned data in a common file format in the PC system.

33. The PC system executes a scene, and then sends a CMD_GET_DATA command to the smart watch system, and stores returned data.

34. Repeatedly perform the operation in step 33 for a plurality of times, successively store returned data, and number successively stored files, to ensure that a sequence of the numbers of the files is the same as an operation sequence.

35. After the operation is completed, send a CMD_CTRL_L2 command to the smart watch system through the console, and switch the instrumentation program back to an L1 (first-level instrumentation program) level to avoid affecting normal running of the system.

36. After the operation is completed, compare each two adjacent data in all saved data files by using a file comparison tool of the PC system to find out a memory block that appears in later data but not in previous one, store items corresponding to these memory blocks separately (the ITEM found each time is separately stored), and then determine a target item by comparing these items. The target item is an item corresponding to a memory block in which a memory leak occurs in these items.

It should be noted that, in the foregoing embodiment, the memory leak detection manner is used to quickly determine that there is a memory leak in the scene. Therefore, each data file herein must have a regular increase of items, and data that increases each time is generally the same.

37. After the item that regularly increases each time is found, use a call_stack analysis tool for call_stack of each item to analyze a function call relationship corresponding to call_stack.

38. Directly view source code by using the function call relationship, and lock a location at which the memory leak occurs.

It should be noted that the detection method provided in the embodiments of this application may be performed by an electronic device or a detection apparatus, or a control module that is in the detection apparatus and that is configured to perform the detection method. In the embodiments of this application, that the detection apparatus performs the detection method is used as an example to describe the detection method provided in the embodiments of this application.

This embodiment of this application provides a detection method. A detection module may send a first command to a first electronic device; receive a first target value sent by the first electronic device, that is, a quantity of allocated memory blocks in the first electronic device in a case that the first electronic device performs a first operation; send a second command to the first electronic device in a case that the first electronic device performs a second operation; receive a second target value sent by the first electronic device, that is, a quantity of allocated memory blocks in the first electronic device in the case that the first electronic device performs the second operation; and in a case that the second target value is greater than the first target value, determine that there is a memory leak in the first electronic device. In this solution, in a scene in which an operation is performed in the first electronic device, signaling interaction between the first electronic device and a second electronic device is performed, to send, to the second electronic device, quantities of allocated memory blocks when the first operation and the second operation are separately performed, so that a memory leak problem can be quickly troubleshot by using values of the quantities of memory blocks. Therefore, in the solution in this application, on the premise of occupying less system resources without affecting normal running of the system, whether there is a leak in a memory system of the electronic device can be quickly detected, and steps of troubleshooting a memory leak by a developer is simplified, so that consumption of troubleshooting the memory leak by the developer is reduced and efficiency of detecting whether there is a memory leak is improved, thereby improving efficiency of the overall development process.

Figure 3:
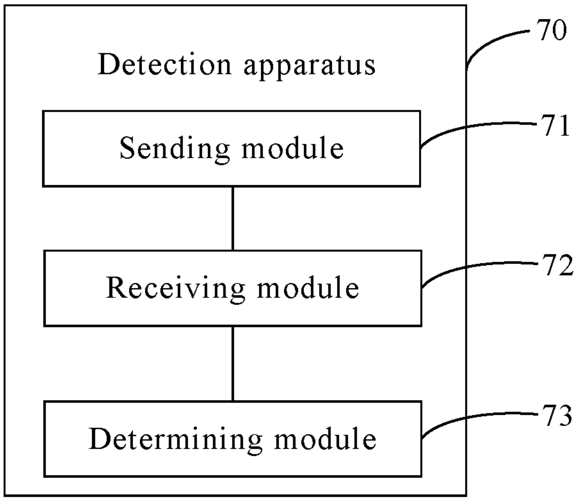
FIG. 3 is a first schematic structural diagram of a memory leak detection apparatus according to an embodiment of this application.

FIG. 3 is a possible schematic structural diagram of a detection apparatus according to an embodiment of this application. As shown in FIG. 3, a detection apparatus 70 may include a sending module 71, a receiving module 72, and a determining module 73.

The sending module 71 is configured to send a first command to a first electronic device, where the first command is used to request a first memory parameter of the first electronic device. The receiving module 72 is configured to receive a first target value sent by the first electronic device, where the first target value includes a quantity of allocated memory blocks in the first electronic device in a case that the first electronic device performs a first operation. The sending module 71 is further configured to send a second command to the first electronic device in a case that the first electronic device performs a second operation, where the second command is used to request a second memory parameter of the first electronic device. The receiving module 72 is further configured to receive a second target value sent by the first electronic device, where the second target value includes a quantity of allocated memory blocks in the first electronic device in the case that the first electronic device performs the second operation. The determining module 73 is configured to determine, in a case that the second target value is greater than the first target value, that there is a memory leak in the first electronic device.

This embodiment of this application provides a detection apparatus. A detection module may send a first command to a first electronic device; receive a first target value sent by the first electronic device, that is, a quantity of allocated memory blocks in the first electronic device in a case that the first electronic device performs a first operation; send a second command to the first electronic device in a case that the first electronic device performs a second operation; receive a second target value sent by the first electronic device, that is, a quantity of allocated memory blocks in the first electronic device in the case that the first electronic device performs the second operation; and in a case that the second target value is greater than the first target value, determine that there is a memory leak in the first electronic device. In this solution, in a scene in which an operation is performed in the first electronic device, signaling interaction between the first electronic device and a second electronic device is performed, to send, to the second electronic device, quantities of allocated memory blocks when the first operation and the second operation are separately performed, so that a memory leak problem can be quickly troubleshot by using values of the quantities of memory blocks. Therefore, in the solution in this application, on the premise of occupying less system resources without affecting normal running of the system, whether there is a leak in a memory system of the electronic device can be quickly detected, and steps of troubleshooting a memory leak by a developer is simplified, so that consumption of troubleshooting the memory leak by the developer is reduced and efficiency of detecting whether there is a memory leak is improved, thereby improving efficiency of the overall development process.

In a possible implementation, the second operation includes a plurality of second sub-operations, and the second target value includes a plurality of sub-target values corresponding to the plurality of second sub-operations. The determining module 73 is configured to: in a case that each two adjacent sub-target values in the plurality of sub-target values correspond to a same variation, determine that there is a memory leak in the first electronic device, where a sequence of the plurality of sub-target values is determined according to an execution sequence of the plurality of second sub-operations.

In a possible implementation, the sending module 71 is further configured to: before sending the first command to the first electronic device, send a third command to the first electronic device, where the third command is used to request the first electronic device to run a target program in a first manner, where the first target value further includes a size of an allocated memory block in the first electronic device and code used when the allocated memory block is called in the case that the first electronic device performs the first operation; and the second target value further includes a size of an allocated memory block in the first electronic device and code used when the allocated memory block is called in the case that the first electronic device performs the second operation. The determining module 73 is further configured to: after determining that there is a memory leak in the first electronic device, determine a location of the memory leak in the first electronic device according to the first target value and the second target value.

In a possible implementation, the determining module 73 is further configured to: in a case that a target difference is greater than or equal to a preset threshold, determine a first location as the location of the memory leak in the first electronic device, where the first location is a memory location of the code used when the allocated memory block is called in the case that the first electronic device performs the second operation. The determining module 73 is further configured to: in a case that a target difference is less than a preset threshold, determine a second location as the location of the memory leak in the first electronic device, where the second location is a memory location of the code used when the allocated memory block is called in the case that the first electronic device performs the first operation. The target difference is a difference between the size of the allocated memory block in the first electronic device in the case that the first electronic device performs the second operation and the size of the allocated memory block in the first electronic device in the case that the first electronic device performs the first operation.

In a possible implementation, the sending module 71 is further configured to: after the determining module determines the location of the memory leak in the first electronic device, send a fourth command to the first electronic device, where the fourth command is used to request the first electronic device to run the target program in a second manner.

The detection apparatus in this embodiment of this application may be an apparatus, or may be a component, an integrated circuit, or a chip in a detection module. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine, or a self-service machine. This is not limited in this embodiment of this application.

The detection apparatus in this embodiment of this application may be an apparatus with an operating system. The operating system may be an Android operating system, an iOS operating system, or another possible operating system. This is not limited in this embodiment of this application.

The detection apparatus provided in this embodiment of this application can implement the processes implemented by the detection module in the foregoing method embodiments, and can achieve a same technical effect. To avoid repetition, details are not described herein again.

Figure 4:
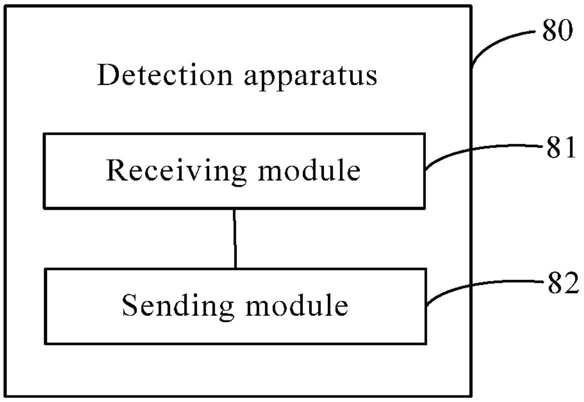
FIG. 4 is a second schematic structural diagram of a memory leak detection apparatus according to an embodiment of this application.

FIG. 4 is a possible schematic structural diagram of a detection apparatus according to an embodiment of this application. As shown in FIG. 4, a detection apparatus 80 may include a receiving module 81 and a sending module 82.

The receiving module 81 is configured to receive a first command sent by a detection module, where the first command is used to request a first memory parameter of the first electronic device. The sending module 82 is configured to send a first target value to the detection module, where the first target value includes a quantity of allocated memory blocks in the first electronic device in a case that the first electronic device performs a first operation. The receiving module 81 is further configured to: in a case that the first electronic device performs a second operation, receiving a second command sent by the detection module, where the second command is used to request a second memory parameter of the first electronic device. The sending module 82 is further configured to send a second target value to the detection module, where the second target value includes a quantity of allocated memory blocks in the first electronic device in the case that the first electronic device performs the second operation, where in a case that the second target value is greater than the first target value, there is a memory leak in the first electronic device.

This embodiment of this application provides a detection apparatus. A detection module may send a first command to a first electronic device; receive a first target value sent by the first electronic device, that is, a quantity of allocated memory blocks in the first electronic device in a case that the first electronic device performs a first operation; send a second command to the first electronic device in a case that the first electronic device performs a second operation; receive a second target value sent by the first electronic device, that is, a quantity of allocated memory blocks in the first electronic device in the case that the first electronic device performs the second operation; and in a case that the second target value is greater than the first target value, determine that there is a memory leak in the first electronic device. In this solution, in a scene in which an operation is performed in the first electronic device, signaling interaction between the first electronic device and a second electronic device is performed, to send, to the second electronic device, quantities of allocated memory blocks when the first operation and the second operation are separately performed, so that a memory leak problem can be quickly troubleshot by using values of the quantities of memory blocks. Therefore, in the solution in this application, on the premise of occupying less system resources without affecting normal running of the system, whether there is a leak in a memory system of the electronic device can be quickly detected, and steps of troubleshooting a memory leak by a developer is simplified, so that consumption of troubleshooting the memory leak by the developer is reduced and efficiency of detecting whether there is a memory leak is improved, thereby improving efficiency of the overall development process.

In a possible implementation, the second operation includes a plurality of second sub-operations, and the second target value includes a plurality of sub-target values corresponding to the plurality of second sub-operations. In a case that each two adjacent sub-target values in the plurality of sub-target values correspond to a same variation, there is a memory leak in the first electronic device, where a sequence of the plurality of sub-target values is determined according to an execution sequence of the plurality of second sub-operations.

In a possible implementation, the detection apparatus further includes a running module. The receiving module 81 is further configured to: before receiving the first command sent by the detection module, receive a third command sent by the detection module, where the third command is used to request the first electronic device to run a target program in a first manner. The running module is configured to run the target program in the first manner according to the third command received by the receiving module 81. The first target value further includes a size of an allocated memory block in the first electronic device and code used when the allocated memory block is called in the case that the first electronic device performs the first operation. The second target value further includes a size of an allocated memory block in the first electronic device and code used when the allocated memory block is called in the case that the first electronic device performs the second operation. The first target value and the second target value are used by the detection module to determine a location of the memory leak in the first electronic device.

In a possible implementation, the receiving module 81 is further configured to: after the second target value is sent to the detection module, receive a fourth command sent by the detection module, where the fourth command is used to request the first electronic device to run the target program in a second manner. The running module is further configured to run the target program in the second manner according to the fourth command received by the receiving module 81.

The detection apparatus in this embodiment of this application may be an apparatus, or may be a component, an integrated circuit, or a chip in an electronic device. The apparatus may be a mobile electronic device, or may be a non-mobile electronic device.

The detection apparatus in this embodiment of this application may be an apparatus with an operating system. The operating system may be an Android operating system, an iOS operating system, or another possible operating system. This is not limited in this embodiment of this application.

The detection apparatus provided in this embodiment of this application can implement the processes implemented by the first electronic device in the foregoing method embodiment, and can achieve a same technical effect. To avoid repetition, details are not described herein again.

Figure 5:
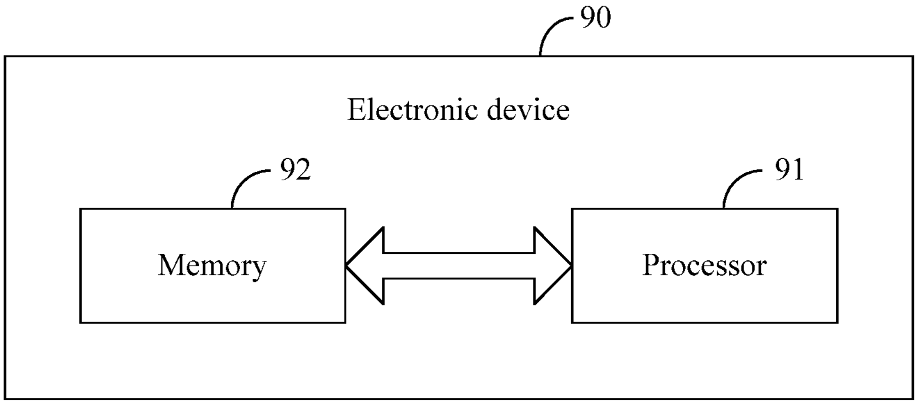
FIG. 5 is a first schematic diagram of a hardware structure of an electronic device according to an embodiment of this application.

Optionally, as shown in FIG. 5, an embodiment of this application further provides an electronic device 90, including a processor 91, a memory 92, and a program or an instruction stored in the memory 92 and executable on the processor 91. When the program or the instruction is executed by the processor 91, the processes of the foregoing method embodiment are implemented and a same technical effect can be achieved. To avoid repetition, details are not described herein again.

It should be noted that the electronic device in this embodiment of this application includes the foregoing mobile electronic device and the foregoing non-mobile electronic device.

Figure 6:
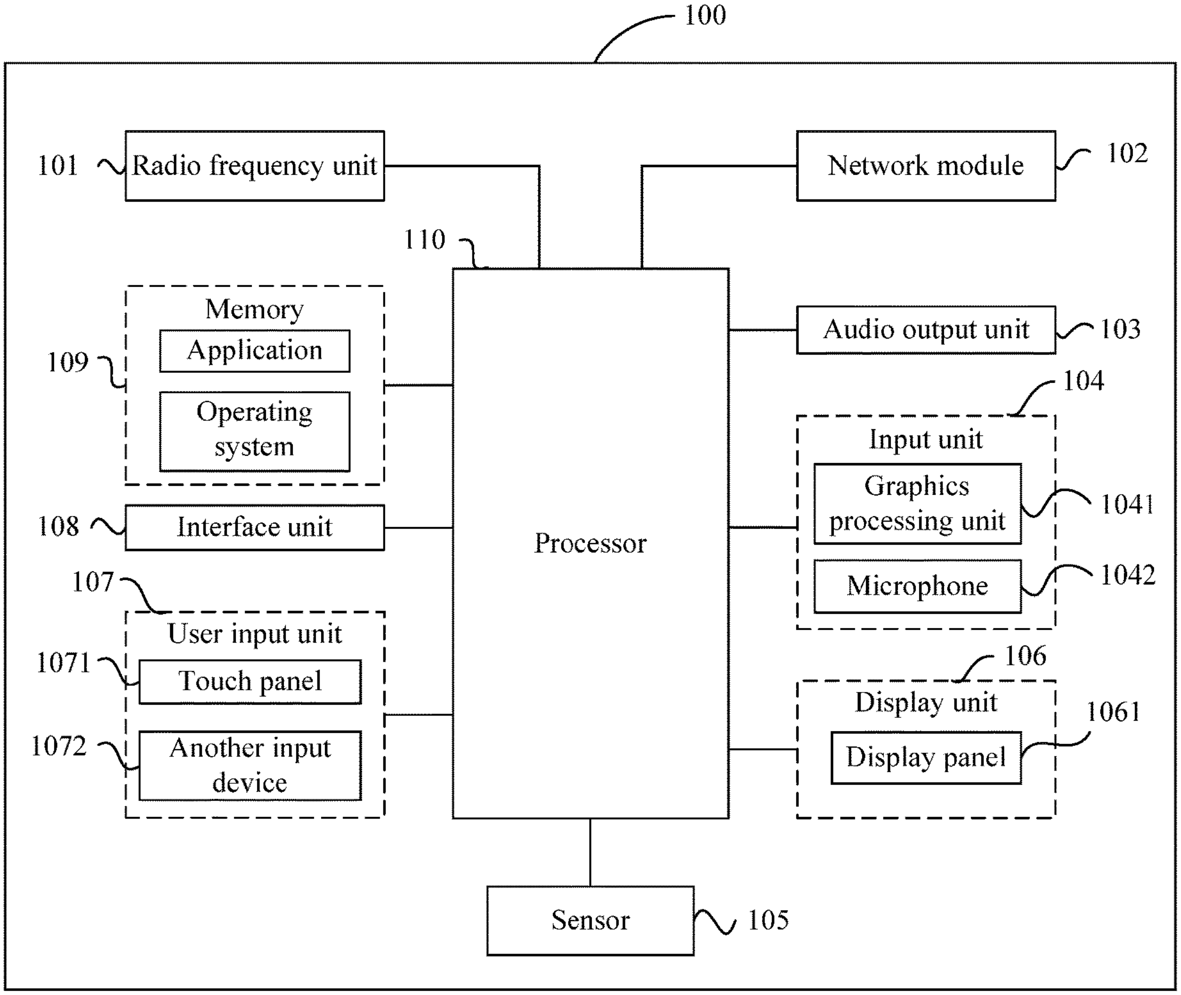
FIG. 6 is a second schematic diagram of a hardware structure of an electronic device according to an embodiment of this application.

FIG. 6 is a schematic diagram of a hardware structure of an electronic device according to an embodiment of this application.

An electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the electronic device 100 may further include a power supply (such as a battery) that supplies power to each component. The power supply may be logically connected to the processor 110 by using a power supply management system, to implement functions such as charging and discharging management, and power consumption management by using the power supply management system. The structure of the electronic device shown in FIG. 6 does not constitute a limitation on the electronic device. The electronic device may include components more or fewer than those shown in the diagram, a combination of some components, or different component arrangements. Details are not described herein.

It should be noted that the diagram of the hardware structure of the electronic device 100 may be a diagram of a hardware structure of a first electronic device provided in the embodiments of this application.

The radio frequency unit 101 is configured to send a first command to a first electronic device, where the first command is used to request a first memory parameter of the first electronic device. The user input unit 107 is configured to receive a first target value sent by the first electronic device, where the first target value includes a quantity of allocated memory blocks in the first electronic device in a case that the first electronic device performs a first operation. The radio frequency unit 101 is further configured to send a second command to the first electronic device in a case that the first electronic device performs a second operation, where the second command is used to request a second memory parameter of the first electronic device. The user input unit 107 is further configured to receive a second target value sent by the first electronic device, where the second target value includes a quantity of allocated memory blocks in the first electronic device in the case that the first electronic device performs the second operation. The processor 110 is configured to determine, in a case that the second target value is greater than the first target value, that there is a memory leak in the first electronic device.

Alternatively, the user input unit 107 is configured to receive a first command sent by a detection module, where the first command is used to request a first memory parameter of the first electronic device. The radio frequency unit 101 is configured to send a first target value to the detection module, where the first target value includes a quantity of allocated memory blocks in the first electronic device in a case that the first electronic device performs a first operation. The user input unit 107 is further configured to: in a case that the first electronic device performs a second operation, receiving a second command sent by the detection module, where the second command is used to request a second memory parameter of the first electronic device. The radio frequency unit 101 is further configured to send a second target value to the detection module, where the second target value includes a quantity of allocated memory blocks in the first electronic device in the case that the first electronic device performs the second operation, where in a case that the second target value is greater than the first target value, there is a memory leak in the first electronic device.

This embodiment of this application provides an electronic device. A detection module may send a first command to a first electronic device; receive a first target value sent by the first electronic device, that is, a quantity of allocated memory blocks in the first electronic device in a case that the first electronic device performs a first operation; send a second command to the first electronic device in a case that the first electronic device performs a second operation; receive a second target value sent by the first electronic device, that is, a quantity of allocated memory blocks in the first electronic device in the case that the first electronic device performs the second operation; and in a case that the second target value is greater than the first target value, determine that there is a memory leak in the first electronic device. In this solution, in a scene in which an operation is performed in the first electronic device, signaling interaction between the first electronic device and a second electronic device is performed, to send, to the second electronic device, quantities of allocated memory block when the first operation and the second operation are separately performed, so that a memory leak problem can be quickly troubleshot by using values of the quantities of memory blocks. Therefore, in the solution in this application, on the premise of occupying less system resources without affecting normal running of the system, whether there is a leak in a memory system of the electronic device can be quickly detected, and steps of troubleshooting a memory leak by a developer is simplified, so that consumption of troubleshooting the memory leak by the developer is reduced and efficiency of detecting whether there is a memory leak is improved, thereby improving efficiency of the overall development process.

The electronic device provided in this embodiment of this application can implement the processes implemented in the foregoing method embodiment, and can achieve a same technical effect. To avoid repetition, details are not described herein again.

For beneficial effects of the implementations in this embodiment, refer to the beneficial effects of the corresponding implementations in the foregoing method embodiment. To avoid repetition, details are not described herein again.

It should be understood that, in this embodiment of this application, the input unit 104 may include a graphics processing unit (GPU) 1041 and a microphone 1042, and the graphics processing unit 1041 processes image data of a still picture or a video obtained by an image capture apparatus (such as a camera) in a video capture mode or an image capture mode. The display unit 106 may include a display panel 1061. Optionally, the display panel 1061 may be configured in a form such as a liquid crystal display or an organic light-emitting diode. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein. The memory 109 may be configured to store a software program and various data, including but not limited to an application and an operating system. An application processor and a modem processor may be integrated into the processor 110, the application processor mainly processes an operating system, a user interface, an application, and the like, and the modem processor mainly processes wireless communication. It can be understood that, alternatively, the modem processor may not be integrated into the processor 110.

An embodiment of this application further provides a non-transitory readable storage medium. The non-transitory readable storage medium stores a program or an instruction, and when the program or the instruction is executed by a processor, the processes of the foregoing method embodiment are implemented and a same technical effect can be achieved. To avoid repetition, details are not described herein again.

The processor is a processor in the electronic device in the foregoing embodiment. The non-transitory readable storage medium includes a non-transitory computer-readable storage medium, such as a computer read-only memory (ROM), a random access memory (RAM), a magnetic disk, or an optical disc.

An embodiment of this application further provides a chip. The chip includes a processor and a communications interface, the communications interface is coupled to the processor, and the processor is configured to run a program or an instruction to implement the processes of the foregoing method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms “include”, “comprise”, or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by “includes a . . . ” does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a non-transitory storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A detection method for memory leak detection, wherein the method is performed by a detection module and comprises:

sending a first command to a first electronic device, wherein the first command is used to request a first memory parameter of the first electronic device;

receiving a first target value sent by the first electronic device, wherein the first target value comprises a quantity of allocated memory blocks in the first electronic device in a case that the first electronic device performs a first operation, wherein the first operation comprises displaying a first page;

sending a second command to the first electronic device in a case that the first electronic device performs a second operation, wherein the second command is used to request a second memory parameter of the first electronic device, wherein the second operation comprises switching to the first page from a second page;

receiving a second target value sent by the first electronic device, wherein the second target value comprises a quantity of allocated memory blocks in the first electronic device in the case that the first electronic device performs the second operation; and determining, in a case that the second target value is greater than the first target value, that there is a memory leak in the first electronic device;

wherein before the sending the first command to the first electronic device, the method further comprises:

sending a third command to the first electronic device, wherein the third command is used to request the first electronic device to run a target program in a first manner, wherein the first target value further comprises a size of an allocated memory block in the first electronic device and code used when the allocated memory block is called in the case that the first electronic device performs the first operation; and the second target value further comprises a size of an allocated memory block in the first electronic device and code used when the allocated memory block is called in the case that the first electronic device performs the second operation;

after the determining that there is a memory leak in the first electronic device, the method further comprises:

determining a location of the memory leak in the first electronic device according to the first target value and the second target value;

wherein the determining a location of the memory leak in the first electronic device according to the first target value and the second target value comprises:

in a case that a target difference is greater than or equal to a preset threshold, determining a first location as the location of the memory leak in the first electronic device, wherein the first location is a memory location of the code used when the allocated memory block is called in the case that the first electronic device performs the second operation; or in a case that a target difference is less than a preset threshold, determining a second location as the location of the memory leak in the first electronic device, wherein the second location is a memory location of the code used when the allocated memory block is called in the case that the first electronic device performs the first operation, wherein the target difference is a difference between the size of the allocated memory block in the first electronic device in the case that the first electronic device performs the second operation and the size of the allocated memory block in the first electronic device in the case that the first electronic device performs the first operation.

2. The method according to claim 1, wherein the second operation comprises a plurality of second sub-operations, and the second target value comprises a plurality of sub-target values corresponding to the plurality of second sub-operations; and the determining, in a case that the second target value is greater than the first target value, that there is a memory leak in the first electronic device comprises:

in a case that each two adjacent sub-target values in the plurality of sub-target values correspond to a same variation, determining that there is a memory leak in the first electronic device, wherein a sequence of the plurality of sub-target values is determined according to an execution sequence of the plurality of second sub-operations.

3. The method according to claim 1, wherein after the determining a location of the memory leak in the first electronic device, the method further comprises:

sending a fourth command to the first electronic device, wherein the fourth command is used to request the first electronic device to run the target program in a second manner.

4. A detection method for memory leak detection, wherein the method is performed by a first electronic device and comprises:

receiving a first command sent by a detection module, wherein the first command is used to request a first memory parameter of the first electronic device;

sending a first target value to the detection module, wherein the first target value comprises a quantity of allocated memory blocks in the first electronic device in a case that the first electronic device performs a first operation, wherein the first operation comprises displaying a first page;

in a case that the first electronic device performs a second operation, receiving a second command sent by the detection module, wherein the second command is used to request a second memory parameter of the first electronic device, wherein the second operation comprises switching to the first page from a second page; and sending a second target value to the detection module, wherein the second target value comprises a quantity of allocated memory blocks in the first electronic device in the case that the first electronic device performs the second operation, wherein in a case that the second target value is greater than the first target value, there is a memory leak in the first electronic device;

wherein before the receiving the first command sent by the detection module, the method further comprises:

receiving a third command sent by the detection module, wherein the third command is used to request the first electronic device to run a target program in a first manner; and running the target program in the first manner according to the third command, wherein the first target value further comprises a size of an allocated memory block in the first electronic device and code used when the allocated memory block is called in the case that the first electronic device performs the first operation;

the second target value further comprises a size of an allocated memory block in the first electronic device and code used when the allocated memory block is called in the case that the first electronic device performs the second operation; and the first target value and the second target value are used by the detection module to determine a location of the memory leak in the first electronic device; wherein in a case that a target difference is greater than or equal to a preset threshold, a first location is determined as the location of the memory leak in the first electronic device, wherein the first location is a memory location of the code used when the allocated memory block is called in the case that the first electronic device performs the second operation; or in a case that a target difference is less than a preset threshold, a second location is determined as the location of the memory leak in the first electronic device, wherein the second location is a memory location of the code used when the allocated memory block is called in the case that the first electronic device performs the first operation, wherein the target difference is a difference between the size of the allocated memory block in the first electronic device in the case that the first electronic device performs the second operation and the size of the allocated memory block in the first electronic device in the case that the first electronic device performs the first operation.

5. The method according to claim 4, wherein the second operation comprises a plurality of second sub-operations, and the second target value comprises a plurality of sub-target values corresponding to the plurality of second sub-operations; and in a case that each two adjacent sub-target values in the plurality of sub-target values correspond to a same variation, there is a memory leak in the first electronic device, wherein a sequence of the plurality of sub-target values is determined according to an execution sequence of the plurality of second sub-operations.

6. The method according to claim 4, wherein after the sending a second target value to the detection module, the method further comprises:

receiving a fourth command sent by the detection module, wherein the fourth command is used to request the first electronic device to run the target program in a second manner; and running the target program in the second manner according to the fourth command.

7. A detection module, comprising a processor, a memory, and a program or an instruction stored in the memory and executable on the processor, wherein the program or the instruction, when executed by the processor, causes the detection module to perform:

sending a first command to a first electronic device, wherein the first command is used to request a first memory parameter of the first electronic device;

receiving a first target value sent by the first electronic device, wherein the first target value comprises a quantity of allocated memory blocks in the first electronic device in a case that the first electronic device performs a first operation, wherein the first operation comprises displaying a first page;

sending a second command to the first electronic device in a case that the first electronic device performs a second operation, wherein the second command is used to request a second memory parameter of the first electronic device, wherein the second operation comprises switching to the first page from a second page;

receiving a second target value sent by the first electronic device, wherein the second target value comprises a quantity of allocated memory blocks in the first electronic device in the case that the first electronic device performs the second operation; and determining, in a case that the second target value is greater than the first target value, that there is a memory leak in the first electronic device;

wherein the program or the instruction, when executed by the processor, causes the detection module to further perform:

sending a third command to the first electronic device, wherein the third command is used to request the first electronic device to run a target program in a first manner, wherein the first target value further comprises a size of an allocated memory block in the first electronic device and code used when the allocated memory block is called in the case that the first electronic device performs the first operation; and the second target value further comprises a size of an allocated memory block in the first electronic device and code used when the allocated memory block is called in the case that the first electronic device performs the second operation;

wherein the program or the instruction, when executed by the processor, causes the detection module to further perform:

determining a location of the memory leak in the first electronic device according to the first target value and the second target value;

wherein the program or the instruction, when executed by the processor, causes the detection module to perform:

in a case that a target difference is greater than or equal to a preset threshold, determining a first location as the location of the memory leak in the first electronic device, wherein the first location is a memory location of the code used when the allocated memory block is called in the case that the first electronic device performs the second operation; or in a case that a target difference is less than a preset threshold, determining a second location as the location of the memory leak in the first electronic device, wherein the second location is a memory location of the code used when the allocated memory block is called in the case that the first electronic device performs the first operation, wherein the target difference is a difference between the size of the allocated memory block in the first electronic device in the case that the first electronic device performs the second operation and the size of the allocated memory block in the first electronic device in the case that the first electronic device performs the first operation.

8. The detection module according to claim 7, wherein the second operation comprises a plurality of second sub-operations, and the second target value comprises a plurality of sub-target values corresponding to the plurality of second sub-operations; and the program or the instruction, when executed by the processor, causes the detection module to perform:

in a case that each two adjacent sub-target values in the plurality of sub-target values correspond to a same variation, determining that there is a memory leak in the first electronic device, wherein a sequence of the plurality of sub-target values is determined according to an execution sequence of the plurality of second sub-operations.

9. The detection module according to claim 7, wherein the program or the instruction, when executed by the processor, causes the detection module to further perform:

sending a fourth command to the first electronic device, wherein the fourth command is used to request the first electronic device to run the target program in a second manner.

10. An electronic device, wherein the electronic device is a first electronic device, comprising a processor, a memory, and a program or an instruction stored in the memory and executable on the processor, wherein when the program or the instruction is executed by the processor, steps of the detection method according to claim 4 are implemented.

11. The electronic device according to claim 10, wherein the second operation comprises a plurality of second sub-operations, and the second target value comprises a plurality of sub-target values corresponding to the plurality of second sub-operations; and in a case that each two adjacent sub-target values in the plurality of sub-target values correspond to a same variation, there is a memory leak in the first electronic device, wherein a sequence of the plurality of sub-target values is determined according to an execution sequence of the plurality of second sub-operations.

12. The electronic device according to claim 10, wherein the program or the instruction, when executed by the processor, causes the first electronic device to further perform:

receiving a fourth command sent by the detection module, wherein the fourth command is used to request the first electronic device to run the target program in a second manner; and running the target program in the second manner according to the fourth command.

13. A non-transitory readable storage medium, wherein a program or an instruction is stored in the non-transitory readable storage medium, and when the program or the instruction is executed by a processor, steps of the detection method according to claim 1 are implemented.

14. A non-transitory readable storage medium, wherein a program or an instruction is stored in the non-transitory readable storage medium, and when the program or the instruction is executed by a processor, steps of the detection method according to claim 6 are implemented.

* * * * *